United States Patent [19]
Kitchen et al.

[11] Patent Number: 5,655,909
[45] Date of Patent: Aug. 12, 1997

[54] SKYDIVING TRAINER WINDTUNNEL

[76] Inventors: William J. Kitchen, 10385 Sailor Ct., Longmont, Colo. 80501; Kenneth G. Bird, P.O. Box 90265, Casper, Wyo. 82609

[21] Appl. No.: 398,754

[22] Filed: Mar. 6, 1995

[51] Int. Cl.$^6$ ..................................................... G09B 9/00
[52] U.S. Cl. ................... 434/44; 434/43; 472/49
[58] Field of Search ................... 434/29, 30, 34, 434/43, 44, 56, 55, 307 R; 472/49, 50, 61, 130, 131, 133; 273/433, 438, DIG. 17

[56] References Cited

U.S. PATENT DOCUMENTS

| | | | |
|---|---|---|---|
| 4,439,157 | 3/1984 | Breglia et al. | 434/44 |
| 4,487,410 | 12/1984 | Sassak | 472/131 |
| 4,545,574 | 10/1985 | Sassak | 434/34 |
| 4,710,129 | 12/1987 | Newman et al. | 472/60 |
| 5,319,337 | 6/1994 | Yoshikawa | 345/179 |
| 5,417,615 | 5/1995 | Beard | 472/50 |
| 5,429,140 | 7/1995 | Burdea et al. | 128/774 |

FOREIGN PATENT DOCUMENTS 1766440  10/1992  U.S.S.R. ................... 472/131

OTHER PUBLICATIONS

Virtual Environment Display Workshop, Oct. 1986, NASA.
ACM 1986 Workshop—Interactive 3D Graphics, Fisher et al.
Head Trip, Popular Mechanics, Feb. 1995, Willcox.
"Video Wall Projection System" brochure. (No date submitted and not available, copy of record.

*Primary Examiner*—Paul J. Hirsch
*Attorney, Agent, or Firm*—Rick Martin

[57] ABSTRACT

A skydiving simulator combines a vertical air chamber with a video projection system on the interior wall. A virtual reality environment is created as the skydiver, while suspended, sees actual film footage of scenarios descending toward earth. A skydiver backpack houses a transmitter which interactively steps the skydiver through emergency procedures.

6 Claims, 5 Drawing Sheets

SKYDIVING TRAINER WINDTUNNEL

FIELD OF INVENTION

The present invention relates to a new combination of a vertical wind tunnel which suspends a human in flight and a computer sequenced virtual reality video system which simulates various scenarios of a skydiver approaching the ground.

BACKGROUND OF THE INVENTION

Known in the art of skydiving training are two types of vertical wind tunnels. The first type is an open air wind column which suspends the skydiver over the fan outlet. If the skydiver maneuvers out of the air column, then he falls violently to the ground. The second type of vertical wind tunnel is a fully enclosed cylinder having a screen type floor that supports a skydiver. The skydiver is enclosed in a cylindrical chamber out of which he cannot fall.

While the chambers are known in the art, they have not been combined with an automated video system. The new combination described herein simulates the visual aspects of skydiving concurrently with the physical weightlessness aspects of skydiving. A programmable large screen video system is installed in a cylindrical chamber thereby presenting actual skydiving film scenarios to the suspended skydiver.

SUMMARY OF THE INVENTION

The main object of the present invention is to provide a flight simulator for a skydiver.

Another object of the present invention is to provide programmable video sequences in the flight simulator to simulate both emergency situations and precision drill techniques.

Yet another object of the present invention is to provide interactive simulation scenarios based on the skydiver's choice of actions during the simulation.

Other objects of this invention will appear from the following description and appended claims, reference being had to the accompanying drawings forming a part of this specification wherein like reference characters designate corresponding parts in the several views.

The present invention comprises a traditional vertical air column chamber. A closed cylinder has a fan system supporting a vertical column of air at about 120 mph. This vertical column of air can support a skydiver in a weightless state inside the chamber. The physical phenomenon of the free fall aspect of skydiving is substantially simulated.

Inside the chamber a large screen video projection system covers at least 120° of the inside of the chamber. The skydiver can suspend himself in front of the large screen. The large screen is then programmed to project the actual film footage of falling towards the earth. Thus, a virtual reality skydiving flight simulator is created.

Training can be accomplished by showing interactive chute failure scenarios and many other aspects of a skydiving free fall.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
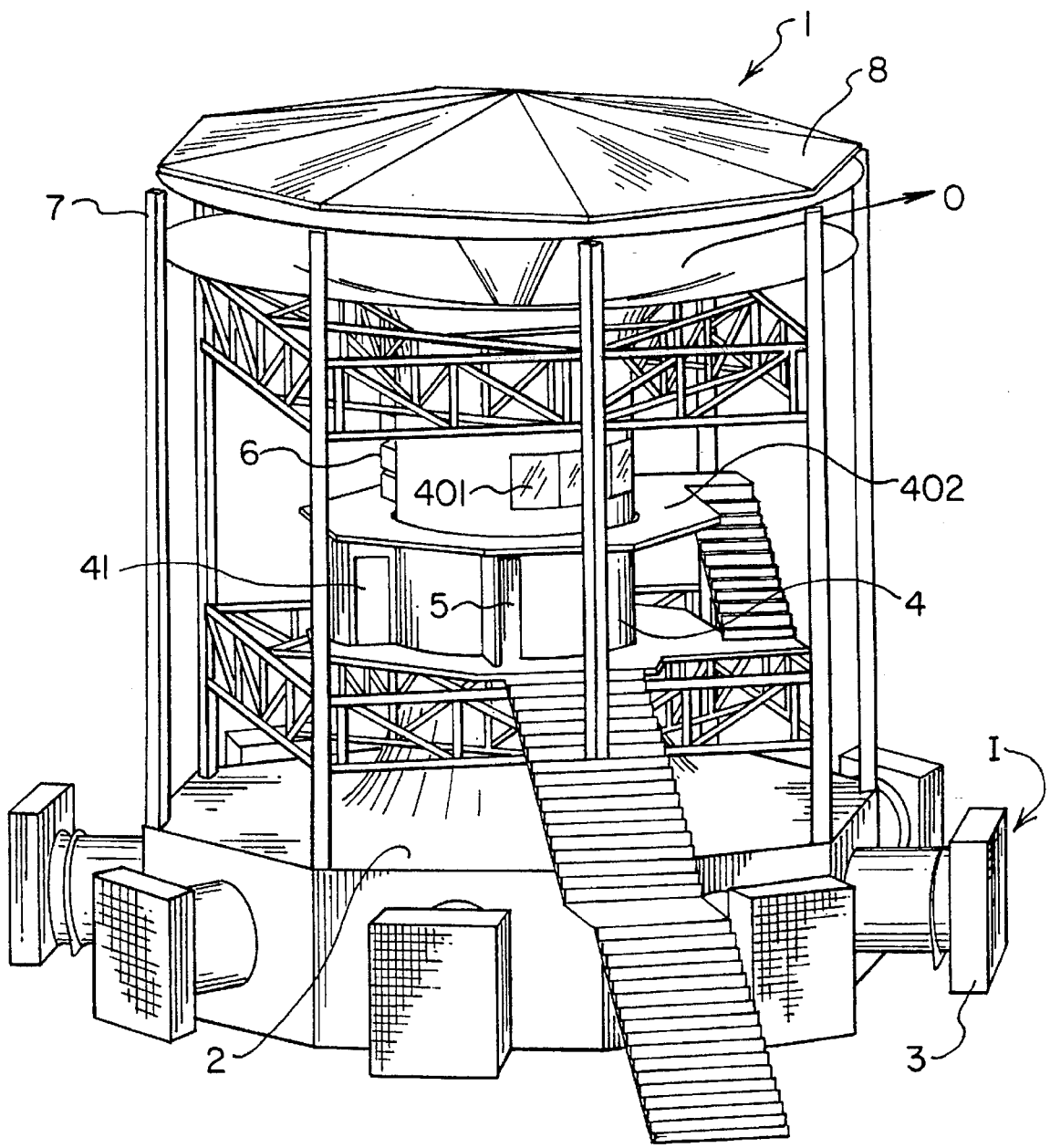
FIG. 1 is a front perspective view of the preferred embodiment.
Figure 3:
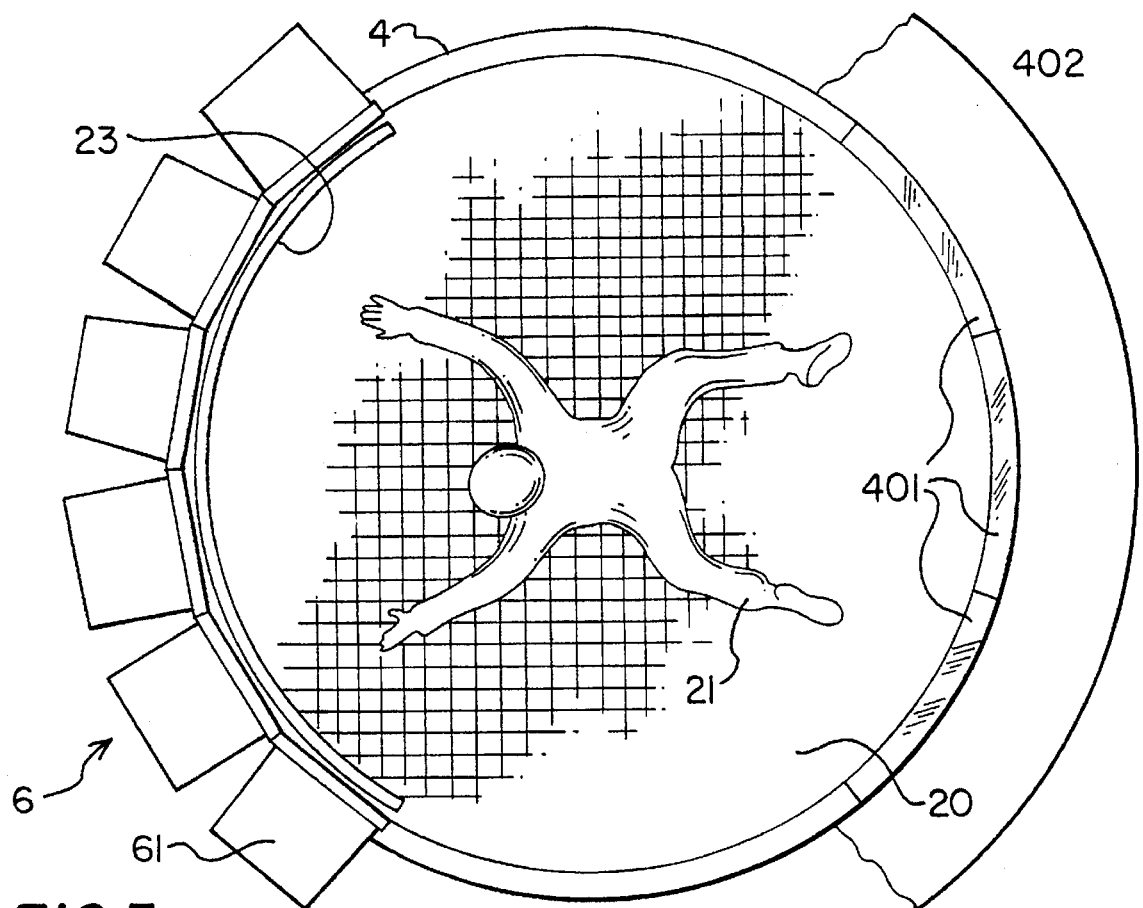
FIG. 3 is a top plan view of the air chamber of FIG. 2.
Figure 2:
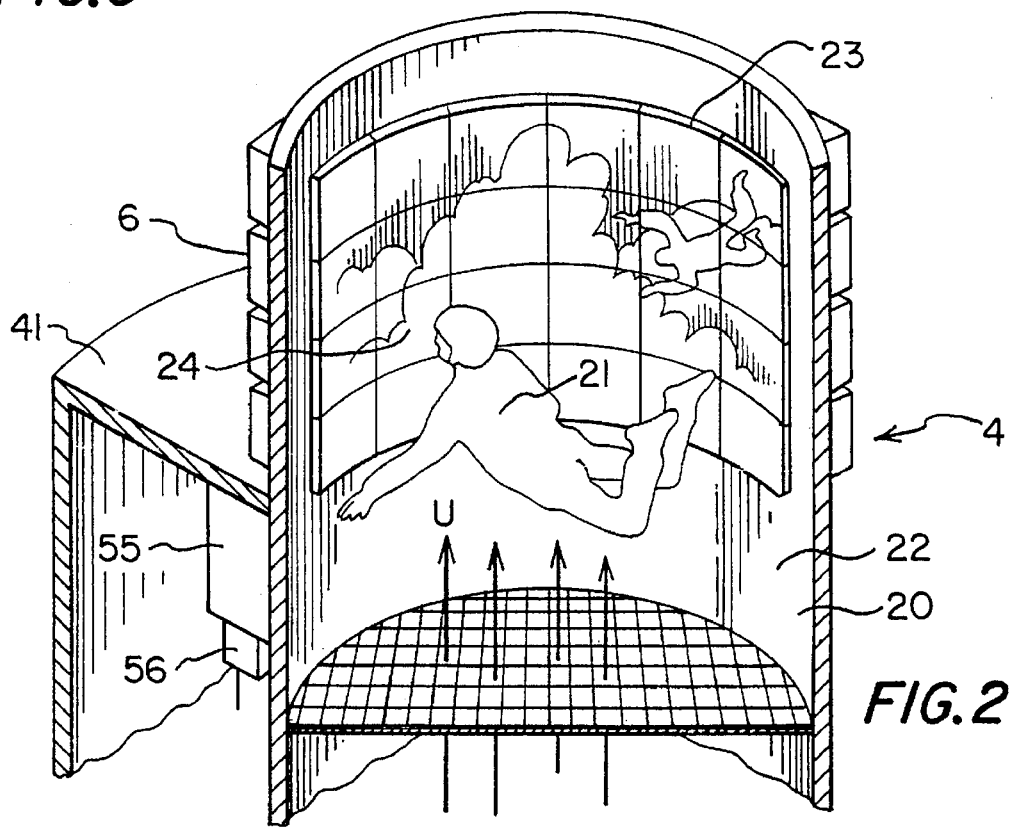
FIG. 2 is a longitudinal sectional view of the air chamber of the preferred embodiment of FIG. 1 having a skydiver suspended therein.
Figure 4:
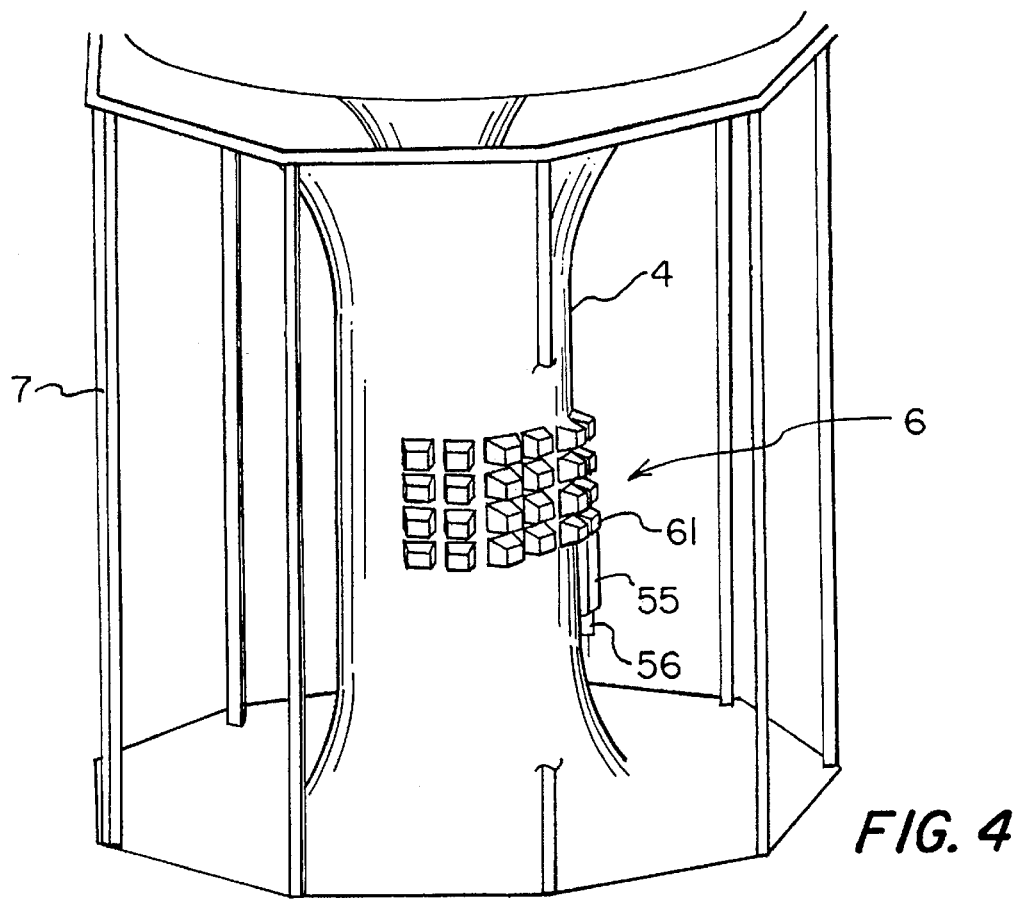
FIG. 4 is a front perspective close-up view of the projection system shown in FIG. 1.
Figure 5:
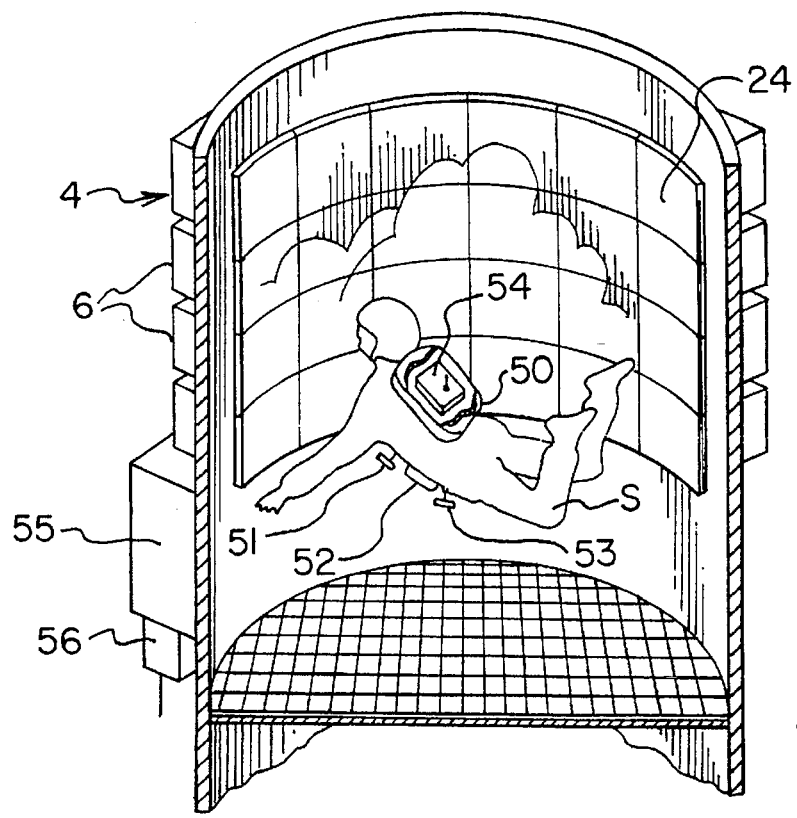
FIG. 5 is a longitudinal sectional view of the air chamber of FIGS. 2, 3 showing a skydiver wearing a backup parachute simulator having a telemetry transmitter.

Referring first to FIG. 1 a skydiving simulator 1 is comprised of a base 2 having a fan means 3 functioning to force air in direction I up into a vertical chamber 4. The air travels up inside the chamber 4 at about 120 mph, thereby supporting a skydiver in a weightless state as shown in FIGS. 2, 3, 5. The air exists out laterally in direction O from under the roof 8. A frame 7 supports the vertical chamber 4. The known video projection system 6 is shown in more detail in FIG. 6. The skydiver enters the vertical chamber 4 through door 5. A control room 41 houses the video wall projection unit controls and the fan controls.

Referring next to FIG. 2 the vertical chamber 4 is seen to have an open air support floor 20 which allows the air to flow therethrough in the upward direction U. The skydiver 21 is supported in a weightless state by the air. The vertical chamber 4 has an inside wall 22. At least 120° of arc of the inside wall 22 is covered by a projection screen 23. The projection screen is nominally twelve feet in height. The projection screen 23 projects moving scenarios of actual flight films as shown by scene 24. A video controller 55 in control room 41 (FIG. 2) can also programmatically simulate skydiving maneuvers.

Referring next to FIG. 3 the skydiver 21 is looking straight at the projection screen 23. Each projector 61 is approximately four feet wide and three feet high. Taken as a whole the multiple projectors 61 create a single image on screen 23 in a known manner. The glass panels 401 allow spectators to view the skydiver and screen from platform 402.

The skydiving simulator 1 as described above provides a virtual reality environment for the skydiver. The skydiver is physically suspended in flight as in an actual skydive. Additionally, he is viewing real scenes of descending towards the earth.

FIG. 5 shows skydiver S having a backpack 50. The backpack 50 contains a telemetry transmitter 54 having known circuitry using radio, infra red, and the like. The telemetry transmitter 54 sends a unique signal to the receiver 56 for each of the following three skydiver sactions. First the skydiver pulls his ripcord 51 (signal A). If problems arise, then the skydiver S may pull either the breakaway handle 52 (signal C) or the reserve ripcord 53 (signal B). A controller (not shown) selects the appropriate signal A, B, C for the telemetry transmitter 54 to send.

The telemetry receiver 56 transmits the signal(s) A, B, C to the interactive computer and video controller 55. The interactive computer and controller 55 responds to each signal A, B, C with a programmed scenario on screen 23.

Figure 7:
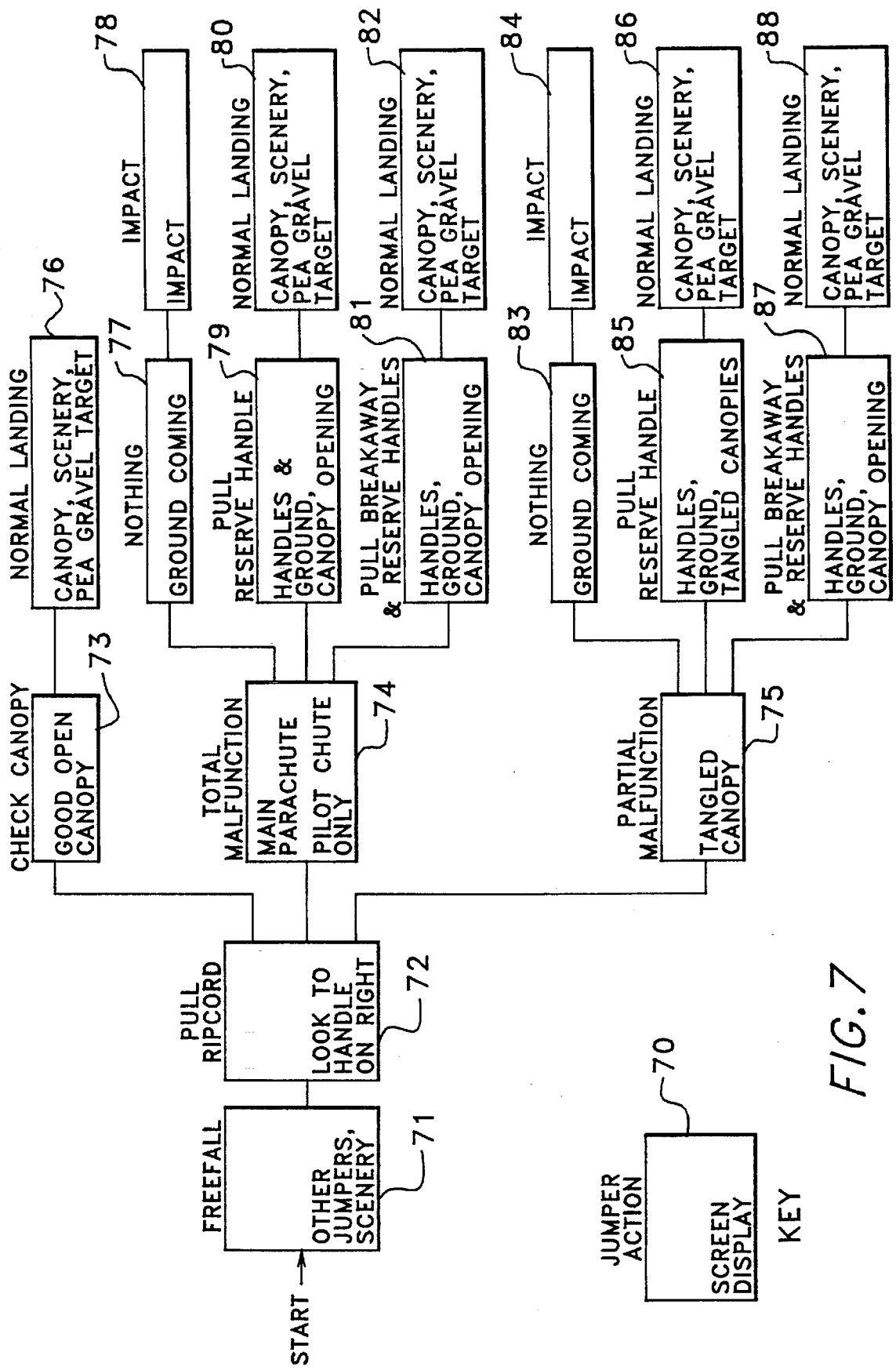
FIG. 7 is a flow chart of one video sequence skydiver training scenario.

One set of programmed scenarios is shown in FIG. 7. Block 70 is the key. The scenario begins at START and block 71 shows the skydiver free-falling while the screen shows film footage of a skydive. Next, the skydiver pulls his ripcord as shown in block 72. Three conditions may be selectively displayed on the screen as shown in blocks 73, 74, 75. This selection is controlled by the interactive computer and controller 55. The skydiver can practice emergency scenarios as shown in blocks 76–88. Countless varieties of scenarios can be programmed on the projection system.

Figure 6:
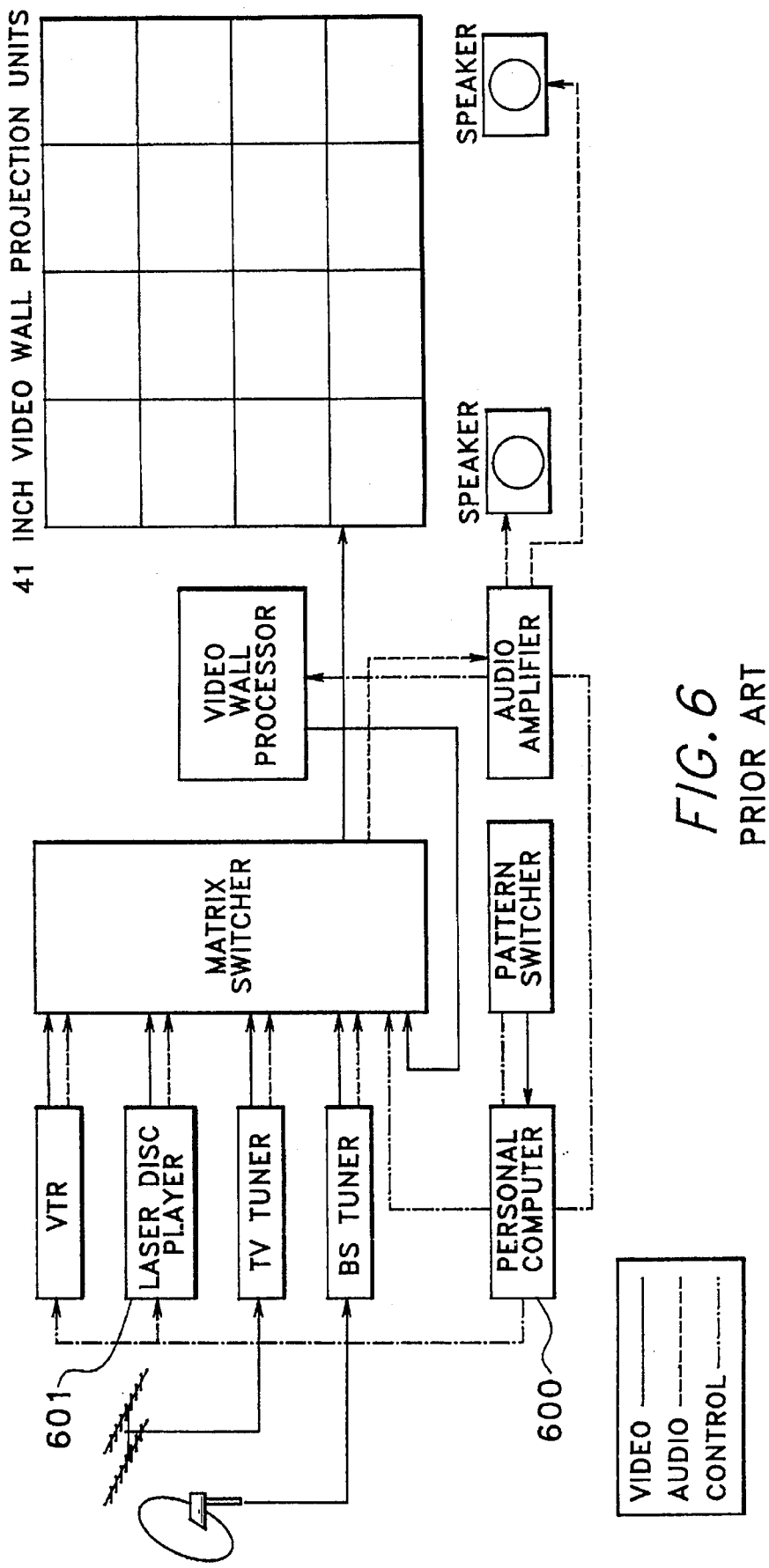
FIG. 6 (prior art) is a schematic of a commercially available video wall projection unit.

FIG. 6 shows a commercially available Toshiba® 16 Screen Video Wall Projection System. Software in the personal computer 600 provides flexible show control of all devices. The laser disc player 601 stores the filmed scenarios. The other known components of the system project the scenarios onto the screen.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A skydiving simulator comprising:

a vertical chamber having an air column capable of supporting a skydiver in flight;

said vertical chamber further comprising an interior side wall surrounding the skydiver;

said interior side wall further comprising a video projection screen; and a video projection system projecting skydiving scenarios on the video projection screen, thereby creating a virtual reality environment for the skydiver.

2. The skydiving simulator of claim 1, wherein the video projection system further comprises a telemetry receiver and a computer which receives signals from the telemetry receiver.

3. The skydiving simulator of claim 2 further comprising a telemetry transmitter worn by the skydiver and functioning to transmit to the telemetry receiver.

4. The skydiving simulator of claim 1 further comprising a backpack worn by the skydiver, said backpack further comprising the telemetry transmitter and a ripcord simulator handle (A) and a reserve chute simulator handle (B) and a breakaway simulator handle (C) and a control circuit which senses an activation of any said simulator handle (A, B, C) and then activates a unique signal for each activation of said simulator handles (A, B, C) for the telemetry transmitter to send.

5. The skydiving simulator of claim 4, wherein the computer further comprises a program responsive to the telemetry receiver and functioning to control the video projection system to play a plurality of predetermined film sequences in response to a plurality of incoming signals received by the telemetry receiver.

6. The skydiving simulator of claim 1, wherein the video projection screen further comprises a dimension covering at least 120° of arc of the interior side wall.

* * * * *